United States Patent [19]

File et al.

[11] 3,736,539

[45] May 29, 1973

[54] MOMENT-FREE TOROIDAL MAGNET DESIGN

[75] Inventors: Joseph File, Trenton; Robert G. Mills, Princeton; George V. Sheffield, Hopewell; Peter Bonanos, E. Brunswick, all of N.J.

[73] Assignee: The United States of America as represented by the United States Atomic Energy Commission, Washington, D.C.

[22] Filed: Apr. 18, 1972

[21] Appl. No.: 245,147

[52] U.S. Cl...................335/216, 174/DIG. 6
[51] Int. Cl..................................H01f 7/22
[58] Field of Search............335/216; 174/DIG. 6; 310/11; 317/123

[56] References Cited

UNITED STATES PATENTS

| | | | |
|---|---|---|---|
| 3,177,408 | 4/1965 | Mills et al. | 335/216 X |
| 3,283,217 | 11/1966 | Cherry | 317/123 |
| 3,559,126 | 1/1971 | Drautman | 335/216 |
| 3,613,006 | 10/1971 | Kantrowitz et al. | 335/216 |

*Primary Examiner*—George Harris
*Attorney*—Roland A. Anderson

[57] ABSTRACT

Apparatus for confining a high temperature plasma column having a large cross-section in a strong magnetic field for increasing the plasma confinement time. The apparatus, comprises a large superconducting moment-free toridal magnet having coil strands in pure-tension that are self-supported on an inner cylindrical member. In one embodiment, two examples are given for a DT reactor and a catalyzed DD fusion reactor.

6 Claims, 7 Drawing Figures

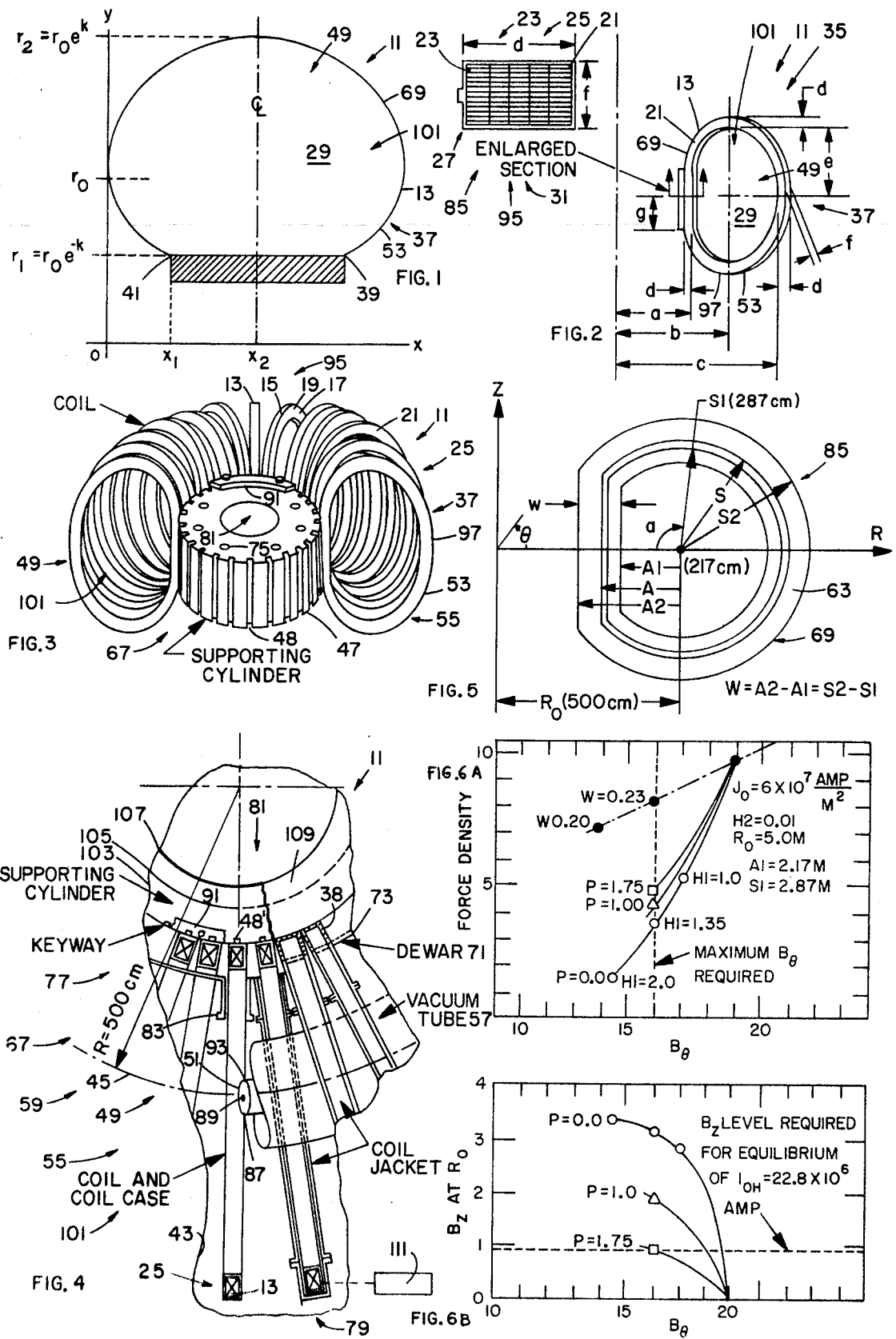

MOMENT-FREE TOROIDAL MAGNET DESIGN

CROSS-REFERENCE TO RELATED APPLICATIONS

U.S. Pat. application Ser. No. 220,905, filed Jan. 26, 1972 entitled Catalyzed d-d Reactor, Robert G. Mills, inventor and assigned to the assignee of this application.

BACKGROUND OF THE INVENTION

This invention was made in the course of or under a contract with the United States Atomic Energy Comission.

Fusion technology requires toroidal containers of large working volumes, and strong magnetic field strengths. Such volumes, for example, involve cylindrical containers for containing endless plasma columns having minor radii of from cms to meters in magnetic fields of average strength up to 10 teslas or more. Moreover, superconducting magnets would be advantageous for producing such magnetic fields to reduce power costs. Various means have been proposed and used to this end, comprising the system described and shown by the co-inventor of this invention in U.S. Pat. No. 3,177,408, wherein stabilized superconductors are used to produce higher fields at a distance from a toroidal plasma column. However, it is advantageous additionally to provide a moment-free toroidal magnet design.

It is an object of this invention, therefore, to provide magnets having constant tension, current-carrying elements for confining a plasma column;

It is also an object to provide an assembly of superconducting coils and a supporting assembly for providing a strong magnetic field for confining a large cross-section plasma column;

It is also an object to provide a magnet and Dewar assembly for confining a DT or catalyzed DD plasma column;

It is a further object to provide a truncated circular coil for force reduced purposes.

SUMMARY OF THE INVENTION

This invention provides a substantially moment-free toroidal magnet for confining a large cross-section plasma column in a strong magnetic field. More particularly, this invention provides magnets having conductors in pure tension throughout much of the winding. In one embodiment, for example, the necessary net forces are taken on a simple structural element, such as a cylinder in compression, and provision is made for apparatus for providing suitable force reduction. In another aspect, a supporting cylinder is provided in an assembly of coils, whereby the supporting cylinder has key ways for locating the coils. In still another aspect, this invention provides a complete superconducting magnet-Dewar assembly around a toroidal vacuum tube for providing a D-T or a catalyzed D-D reactor system. With the proper selection of components, as described in more detail hereinafter, the desired magnet is achieved.

The above and further novel features and objects of this invention will be described in more detail hereinafter in connection with the accompanying drawings, and the novel features of one embodiment will be particularly pointed out in the apended claims.

BRIEF DESCRIPTION OF THE DRAWINGS

In the figures, where like elements are referenced alike:

FIG. 1 is a schematic drawing of the mathematical shape of a constant tension, superconducting, current-carrying element in a 1/R field;

FIG. 2 is a partial three-dimensional view of the superconducting coil of FIG. 1;

FIG. 3 is a partial three dimensional view of one embodiment of the coil of FIG. 2 on a supporting cylinder in accordance with this invention;

FIG. 4 is a partial cross-section of the apparatus of FIG. 3 in a Dewar for providing a practical DT or catalyzed DD reactor in accordance with this invention.

FIG. 5 is a partial schematic view of a truncated circular coil used in force-reduced calculations for the coil of FIG. 4;

FIGS. 6a and 6b are graphic illustrations of the results of calculations for a suitable force-reduced configuration for the coil of FIG. 4.

DESCRIPTION OF THE PREFERRED EMBODIMENT

This invention is useful in the field of plasma physics. As such, this invention is useful for any of the applications to which the heretofore known plasma research reactors, such as stellarators, tokamaks and spherators, have been applied. However, since this invention involves large plasma column cross-sections, and strong magnetic fields, this invention is additionally useful for D-T and/or catalyzed D-D fusion reactors, such as described and shown in the above-mentioned co-pending application by the co-inventor of this application.

It is known that fusion power research is based on concrete experimental results that bode well for the future, and although practical reactors that burn fissionable fuel to manufacture commercial electricity have yet to be built, the expectation is that the potential use of these reactors will be significant. In this regard, the fuels used in the present research reactors will be the same as the fuels that will be used in the full-scale devices that will result therefrom. For example, both the research reactors and the resulting power reactors will magnetically confine electrons and ions at a distance by means of electromagnetic fields. In both cases the fields must confine a cylindrical plasma column of electrons and ions at a distance from the magnet coils in field strengths of up to 160,000 gauss or more in a cylindrical vacuum container. In practical reactors, a field of 150,000 gauss represents a pressure of some 870 atmospheres or some 13 kpsi, where the inward field pressure the magnetic field is capable of exerting is $P_B$, the outward plasma pressure $P_p$ is less than $P_B$, and the ratio of these two pressures is denoted by the symbol $\beta$, which is distinguished from the hereinafter mentioned angle $\beta$.

In both the known and future research reactors employing electromagnetic confinement, the fuels with the largest nuclear fusion cross-sections are of particular interest. For example, reactions for which the cross-section excedes a millibarn ($10^{-27}$ cm$^2$) at energies below 50 keV, comprise the well-known reactions referred to herein for ease of explanation as DD and DT reactions, i.e., $D + D \rightarrow He^3$ (0.82 MeV) $+ n$(2.45 MeV), $D + D \rightarrow T$ (1.01 MeV) $+ p$ (3.03 MeV) and $D + T \rightarrow He^4$ 3.52 14.06 MeV)$+ n$ (14.06 MeV).

Moreover, the DD reaction can be catalyzed, as described in co-pending application, AEC Case No. S-39,063, which was filed by the co-inventor herein. This reaction, comprises $3 D \rightarrow He^4 + p + n$ wherein sufficient tritium (about 0.5 per cent) and $He^3$ (about 15 percent) are added to make all the mentioned reactions plus the $D + He^3 \rightarrow He^4 + p$ reaction proceed at the same rate to maintain a constant inventory of tritium and $He^3$. In all these cases, the reactor, whether it be a research reactor or a full-scale power producing reactor, must provide a magnetically confined plasma column having a large enough radius so that the fuel nucleus undergoes many collisions with other nuclei before it is lost from the system. Even if incoming fuel possesses organized motion, e.g., by injection of a neutral beam into the magnetically confined plasma, the incoming fuel should enter a plasma column having a large radius. In this regard, since the incoming fuel will be randomized by collisions, the reactants will develop a kinetic equilibrium describable by a temperature; that is, they will process a maxwelliam or quasi-maxwellian distribution; and the fuel will be in the form of a hot gas. It will also be understood that the energies required to produce a reasonable reaction rate are in the kiloelectronvolt region, which is well above the ionization energizes of the mentioned light elements. Advantageously, therefore, the magnetically confined fuel is in the form of a substantially fully ionized plasma column having as large a cross-section as possible.

All the manetic means known heretofore for containing the hot plasma fall into two general categories: those that are open and those that are closed, such as disclosed in the above-mentioned patent application by the co-inventor herein. This invention, employs a closed magnetic container, such as disclosed in the above-mentioned co-pending application, in which a specific moment-free coil is used to provide a strong magnetic field in a large cross-section toroidal vacuum container for confining a hot toroidal plasma column.

In connection with the use of the closed toroidal container disclosed in the above-mentioned co-pending application, it will be understood that the therein described axial coil means for producing homogeneous axial magnetic field is the subject of this invention. This homogeneous field has field lines parallel to the axis of the toroidal vacuum container, whereby the plasma particles tend to travel in helical orbits encircling the field lines of the axial magnetic field. Thus, the particles are not free to move across the field toward the vacuum container walls, except as a result of a series of collisions with other particles, and each particle is, in essence, "tied" to a line of force about which it revolves at a radius that depends inversely upon the magnetic field strength. The stronger the field, the smaller is the radius of curvature of the particle. Thus, this magnetic field is as strong as possible, and in accordance with this invention a superconducting force-free coil is used to produce this axial magnetic field.

Before discussing the moment-free coil of this invention in detail it is well to note that additional coils not directly part of this coil provide a stable diffusion rate of the particles across the magnetic field as a result of the mentioned collisions. As is understood in the art, this diffusion rate is inversely proportional to the square of the magnetic field strength (i.e., it varies as $1/B^2$, where $B$ denotes the magnetic field strength.) This relationship is extremely significant, for it shows that if the hot plasma is confined in a stable way by the magnetic field, the rate of the particle diffusion toward the inside walls of the vacuum container may be reduced by increasing the strength of the magnetic field, while the confinement time can be increased by making the cross-section of the plasma column larger. Thus, it will be understood why the plasma column cross-section and the strong confining magnetic field are as large as possible.

There have been three basic techniques for stably confining the plasma in the toroidal plasma column. In the first case, an external set of helical-shaped windings are added to the outside of the vacuum container such as is present in any of the wide number of stellarators that have actually been successfully used heretofore. In the second, a ring conductor is used along the axis of the toroidal plasma column, whereby the plasma forms a closed hollow toroidal tube surrounding the conductor. Such machines have been called spherators, levitrons, or floating multipoles, and these have also operated successfully. The third case involves an internal plasma current along the axis of the toroidal plasma column, such as disclosed in the above-mentioned co-pending application. This type of closed reactor, which is often referred to as a tokamak, and which is employed in the embodiment of this invention described herein, advantageously employs means for inductively causing this plasma current to flow around the closed plasma ring. One suitable means, comprises sets of poloidal field and field shaping coils, which extends longitudinally along the outside of the vacuum container in curves corresponding to the curving axis of the toroidal plasma column and provide the required vertical equilibrium field, as discussed in more detail hereinafter. Advantageously, these sets of coils, as well as the axial field coil are made from superconductors to reduce the power costs necessary to produce the strong magnetic fields for confining the large cross-section plasma column, in accordance with this invention.

It is known that superconductors can produce strong magnetic fields, but to do so the superconductors must be electrically stabilized by a normal resistance matrix member, e.g., in case of flux jumps and the like, as described in the March 1967 "Scientific American". Thus, given the proper matrix, such as Al or Cu, fields of thousands of gauss are obtainable, and the maximum fields produced there by are in excess of 160,000 gauss. Also, to this end, matrix stabilized hard or type II superconductors are advantageous, such as cryogenically cooled, Nb-Ti, $V_3Ga$ and $Nb_3Sn$ superconductors. For providing a stabilizing matrix, which advantageously has an electrical resistivity above that of the superconductor, suitable matices, comprise Al or Cu, as understood from U.S. Pat. No. 3,177,408 by the co-inventor of this invention. It is also difficult to assemble the superconductor in a safe stable configuration, since large amounts of stored energy are involved. In this regard, the matrix of the system of the above-mentioned patent by Mills, the co-inventor herein, forms a large mass in a webb-shaped ribbon having a resistance and/or a load connected to the matrix. In this regard, the superconductor coils may be solid, braided and/or formed from multiplicities of multifilamentary superconductors in a Cu or Al matrix. In any event, however, the normal resistance matrix (e.g., Al or Cu) and the superconductors form a multiplicity of multifilamentary superconductors in a normal resistance matrix that provides a large mass between and around the superconductors. Thus, as will be understood in more detail hereinafter, a ribbon-shaped, matrix stabilized superconductor, such as contemplated by U.S. Pat. No. 3,177,408, is employed in accordance with this invention.

Referring to FIGS. 1 and 2, one embodiment 11 for the conductor 13 of this invention, comprises a $Nb_3Sn$ superconductor 15 stabilized in a matrix 17 of copper 19 for forming a webb-shaped superconductor ribbon 21 having a fillet-shaped rectangular cross-section 23. In this regard, provisions is made for a large mass of matrix 17 to provide a resistance R for receiving losses from the superconductor 13 in the event the superconductor 15 suddenly go into or return to its normal resistance state, either in local or larger areas. It is thus easy to connect the matrix 17 in a circuit C to a load R. Advantageously, coil 25, comprises 14 pancakes 27 of ½ inch wide conductors 13, as illustrated in FIG. 2.

To accomodate a linearly decreasing field 29 through conductor bundle 31 and to conserve space and money, the coil 25 has five sections 33 with five different conductor thicknesses. In operation, the current flowing through the conductor 13 is up to 15,000 amperes. In this regard, the current density in each of the five sections 33 may vary from 3700 amperes/cm² to 18,000 amperes/cm², with an average current density across the area 35 of the coil 25 of 8700 amperes/cm². To this end, the Cu matrix being a normal resistance material, the Cu insulates the current carrying superconductors 15 from each other, although other insulators may be used. Additionally, however, the conductors 13 must be mechanically stabilized, and this is accomplished by the moment-free toroidal coil of this invention, as will be understood in more detail from the following.

It will be understood in regard to the above, that a large superconducting magnet is required, which is capable of exerting a pressure on the conductor, that may be up to about 15,000 psi. Moreover in the toroidal magnet of this invention, the field strength within the useful volume varies inversely with the radius from the axis of symmetry. Heretofore, the conductors generating such fields were subject to bending moments in addition to an effective internal pressure. Accordingly, this invention overcomes these problems by removing the moments, i.e., putting the conductors into pure tension throughout much of the winding, and taking the necessary net forces on a simple structural element that resembles the one disclosed in U.S. Pat. No. 3,319,207. Also, this invention makes use of the techniques of force reduction.

Referring more particularly to FIG. 1, this figure illustrates the mathematical shape of the constant tension, current-carrying element of this invention. In this regard, it will be understood hereinafter that a cylindrical supported, tensioned winding 37 in a case 38, such as provided by this invention for conductor 13, provides such an element. To this end, the figure provides an analysis and derivation of a conductor 13 tethered at either end 39 and 41. This conductor 13 will be understood, therefore, to be stable in the position shown if it is in pure tension. Also, it will not be subject to any bending moments. A further advantage accrues to the superconductor 15 in this winding 37, which uses this conductor 13 in this manner, since large forces will not have to be transmitted through the thermal insulation 43 therefor, which is described in more detail hereinafter.

Referring again to FIGS. 1 and 2, when this conductor 13 is in pure tension, $T$, it will lie in a curve of radius of curvature, $p$, such that the lateral force per unit length on this conductor 13, which is perpendicular to the described magnetic field 29, is proportional to $BI$, where $B$ is the magnetic field and $I$ is current in the conductor 13. In the described toroidal magnetic field 29, the strength $B$ varies inversely as the radius, $r$, from the described axis of symmetry, which is referred to hereinafter as axis 45, as shown e.g., in FIG. 3.

Since in accordance with this invention it is desired to take the net forces on a cylindrical structural element referred to hereinafter as cylinder 47 and shown in FIGS. 3 and 4, the curve tangent to a cylinder 47 processing a radius of curvature proportional to the distance from the axis 45 is determined, as shown in FIG. 1. In this regard, the windings 37 are advantageously keyed into keyways 48 on the outside diameter of cylinder 47. To this end, the inside diameter of cases 38 have extensions 48' that mate with keyways 48. Thus, except where the conductor 13 lies flat against the supporting cylinder 47, the radius of curvature, $p$, of the conductor 13, is proportional to the radius, $r$, or $$p = kr.$$

Since the radius of curvature, $p$, is given by:

$$p = \pm [ 1 + (dr/dz)^2 ]^{3/2} / d^2r/dz^2 ,$$

the solution is obtained to:

$$r(d^2r/dz^2) = (\pm 1/k) [ 1 + (dr/dz)^2 ]^{3/2} \tag{1}$$

This cannot be integrated in closed form, but can be readily solved numerically. It can be integrated once to give the slope, and therefore information on some of the limits of the curve, are as follows:

Let $p = dr/dz$, and (1) becomes $$pr \, dp/dr = \pm 1/k \, (1 + p^2)^{3/2} \tag{2}$$

It is convenient to introduce the dimensionless coordinates, $x$ and $y$, such that $y = r/r_0$, $x = r/r_0$, and $x = 0$, $y = 1 \, dr/dx$) diverges. Equation (2) integrates to yield $$p^2 = (k^2 - (lny + c)^2/lny + c)^2 \tag{3}$$

To determine the integration constant, $c$, note that $p$ should diverge when $y = 1$ or $lny = 0$; thus $c = 0$ and $$p = \pm (k^2 - ln^2y)^{1/2} \tag{4}$$

Thus $p = 0$ at $y = e - k$, and $$r_1 = r_0 e^{\pm k} \tag{5}$$

$$r_2 = r_0 e^k$$

Conversely, to design a magnet winding 37 between two limits, $r_1$ and $r_2$, it follows that $$r_0 = (r_1 r_2)^{1/2} \quad (6)$$

the geometric mean of the two limits. Furthermore from (5), $r_2/r_1 = e^{2k}$
or $$k = \tfrac{1}{2} \ln (r_2/r_1) \quad (7)$$

The $x$ coordinates cannot be found in closed form, but from (4)

$$x = \int_1^y \frac{\pm \ln y \, dy}{(k^2 - \ln^2 y)^{1/2}} \quad (8)$$

and making the substitution, $u = \ln y / k$, $$x = \pm k \int_0^{\pm u} \frac{e^{ku} u \, du}{(1-u^2)^{1/2}} \quad (9)$$

In particular, $$x_1 = -k \int_0^{-1} \frac{e^{ku} u \, du}{(1-u^2)^{1/2}}$$

and $$x_2 = k \int_0^1 \frac{e^{ku} u \, du}{(1-u^2)^{1/2}} \quad (10)$$

which can be evaluated numerically.

For the particular magnets chosen as illustrations $r_2/r_1 \approx 2.78$ and $k \approx 0.51$.

In cgs electromagnetic units, the maximum tension, $T$, is given by $$T_m = BI\rho = BIkr$$

For constant current density, the field falls linearly through the conductor bundle making the average tension, $T$, one-half the above, or:

$$T = \tfrac{1}{2} BIkr$$

The quantity, $Br$, is a constant in a toroidal field, or:

$$T = \tfrac{1}{2} B_m I k r_1$$

where $B_m$ is the maximum field strength generated at $r_1$. The stress on the conductor handle, $\delta$, is $$\delta = \tfrac{1}{2} B_m j k r_1$$

where $j$ is the allowable current density at $B_m$, or:

$$B_m = 2 \, \delta / j k r_1 \quad (11)$$

Thus the maximum field 27 is determined by the allowable stress and current density of the conductor 13 material.

One practical embodiment 11 of the axial field magnet 49 of this invention, is shown in FIG. 4, while Table I tabulates two examples of this magnet 49. In this regard, the coil 25 of this magnet 49 is employed for the catalyzed DD reactor described in the above-mentioned co-pending application, as well as the smaller DT reactor corresponding thereto. To this end, a coil 25 producing a field strength of 160,000 gauss yields satisfactory dimensions. For example, the parameters, comprise a central field 29 along the axis of the toroidal plasma column 51 of 91,000 gauss, a major plasma column radius of 5 meters (about 16.4 feet), and a minor plasma column radius of 170 cm (about 5 feet 3 inches around a circumference of about 1030 feet).

Because of the high friction between adjacent conductors 13 in the bundle 31, the constant tensile force across each of the five sections 33 is the average of the maximum and in the forces in the particular section 33. The maximum tensile strength in the strap 53 formed by conductor 13 is 75,000 psi. The total thickness of the ribbon 21 varies from 0.116 inch in the inner section 33 to 0.022 inch in the outer least stressed section 33. The inductance of the torus 55 formed by the vacuum container 57 of the reactor 59 (FIG. 4) is 13,700 henrys, and the stored energy is 15.4 giga joules. From 0.004 to 0.018 inch of copper 61 in the stabilizing matrix 17 is provided in the ribbon 21. The calculations for a truncated circular shape 63 of coil 25, is used in the force-reduced calculations described hereinafter in connection with this invention, as shown and illustrated in FIGS. 5, 6a and 6b.

Forty such coils 25, evenly spaced and having their windings 37 keyed into keyways 48 of the supporting cylinder 47, comprise the assembly 67 of magnet 49, as shown in FIG. 3. Since each of the conductor strands 69 is in pure tension and self-supporting, the supporting cylinder 47 is subjected only to the compressive magnetic pressure of 15,000 psi.

The cylinder 47 in the first example of this invention described herein, measure 4 meters high, 2.5 meters inside radius, and 50 cm thick, with a maximum stress of 100,000 psi at the maximum strength of field 29, whereby it deflects only 0.7 cm. It weighs, in one example, 540,000 pounds, and is housed in a dewar 71, as shown in FIG. 4. This arrangement eliminates the transmission of high forces through the dewar walls 73. Rods 75 support the whole assembly 77 from the inside structure of the dewar 71. The outer wall 79 supports the inner structure 81 by means of numerous high-strength, low thermal conductivity rods 83 to minimize the heat leakage, which is about 4.0 kilowatts. The dimensions of one example of the catalyzed DD reactor, as well as those for the corresponding DT reactor understood therefrom, are given in the following Table I:

TABLE I. Parameters for Proposed Fusion Reactor Coils

| Item | | D-T Reactor | Catalyzed D Reactor |
|---|---|---|---|
| Superconductor | | $Nb_3Sn$ | $Nb_3Sn$ |
| Width of Conductor | cm | 1.27 | 1.27 |
| Thickness of Conductor | cm | 0.022-0.116 | 0.020-0.089 |
| No. of Pancakes/coil | | 14 | 30 |
| Maximum Field at Conductor | gauss | 160,000 | 160,000 |
| Major Radius | cm | 500 | 1,000 |
| Plasma Radius | cm | 170 | 400 |
| Field at Major Radius | gauss | 91,000 | 88,000 |
| Ampere Turns/Coil | | $5.62 \times 10^6$ | $11.0 \times 10^6$ |
| Minimum Current Density | amp/cm$^2$ | 4,000 | 3,000 |
| Average Current Density | amp/cm$^2$ | 8,800 | 7,000 |
| Current/Conductor | amp | 1,500 | 1,000 |
| Energy Stored in Field | Joules | $15.4 \times 10^9$ | $112 \times 10^9$ |
| Inductance of Torus | henries | 13,700 | 224,000 |
| Weight of Cylinder | lb | $0.55 \times 10^6$ | $3.9 \times 10^6$ |
| Weight of Coils | lb | $1.9 \times 10^6$ | $8.8 \times 10^6$ |
| Weight of Assembly | lb | $2.5 \times 10^6$ | $12.7 \times 10^6$ |
| Centering Force/Coil | lb | $37.3 \times 10^6$ | $146 \times 10^6$ |

| Heat Leak (Structure and Insulation) | kW | 4.0 | 15.0 |

In order to provide a force-reduced tokamak winding 37 for the apparatus of the above-mentioned DD catalyzed reactor, as well as for the smaller DT tokamak 59 corresponding therewith and understood therefrom by reference to the above-mentioned Table I, this invention provides a force-reduced multi-layer toroidal winding 37, which is scaled according to the mentioned Table I. The cross-section of the winding 37 is shown in FIG. 5, which also defines the parameters. The angle, $\beta$, described by the intersection of a conductor 13 in a particular layer 85 and the R-2 plane is given by:

$$\beta = \tan^{-1} (R_o - A)^P H/(SR^{(P-1)}) \quad (12)$$

The characteristics of this equation are such that when the exponent, $P = 0$, $d\theta/d\alpha$, is constant and when $P = 1$, the angle, $\beta$, is constant. The constant H, can vary from layer to layer, and for the purpose of analysis it follows the equation, $$H = (H_2 - H_1) (S - S_1)/(S_2 - S_1) = (H_2 - H_1) (A - A_1)/(A_2 - A_1) \quad (13)$$

For the DT reactor, illustrated in Table I, a current density of 6,000 amperes/cm² is taken as a reasonable value for a winding 37 of the size indicated. The field, as before, is 91,000 gauss at a radius of 5 meters with a maximum field of 160,000 gauss at the inner most conductor 13 and, since the plasma discharge current is $22.8 \times 10^6$ amperes, a 9,000-gauss field in the z direction is required to balance the radial forces on the plasma 87 in container 57 in order to hold it in equilibrium.

In order to solve this problem, a computer code was written to give the fields and force densities resulting throughout the cross-section of the winding due to different winding prescriptions. The results of the design runs are shown in FIGS. 6a and 6b.

First, a standard toroidal confining field winding was run with $P = 0$, $H1 = 0.01$, $H2 = 0.01$, and with the build, W, varying from 20 cm to 28 cm. The results are shown in the top graph of FIG. 6a by a dotted line. This graph gives the maximum force density in the winding 37 as a function of the maximum B in the winding. The result is predictable in that as the build increases, the maximum fields and forces increase. The graph shows that a build of W = 23 cm gives the desired confining field strength with a resulting maximum force density of 3,000 pounds/cubic inch.

Previous work on force-free coil systems described in MATT-127 (1962), High Magnetic Fields, by K. E. Wakefield, M.I.T. Press and John Wiley and Sons, Inc., N.Y. 1962, pp. 39 - 43, and pp. 44 - 47 by D. R. Wells and R. G. Mills, and MATT-208 (1964), indicates that forces in a multi-layer winding like the one described herein, can be reduced by letting the conductors in the inner layers align themselves into helices that are more parallel to the central $B\theta$ field. This is achieved by letting H1 increase in value relative to H2. The effect of varying H1 is shown in FIG. 6a for a build, W = 28 cm. It can be seen that as H1 increases, the maximum force density drops along with the maximum B field. When H1 = 1.35, the maximum $B\theta$ is at the desired level, and the maximum force density has dropped to 1,330 pounds/cubic inch. Therefore, this example more than halves the force in the winding 37 while still generating the required confining field 29.

This example could be frozen at this point except that a vertical field, BZ, arises from the increased $J\theta$ component resulting from increasing H1. The lower plot of FIG. 6b shows that for this example with $P = 0$, the vertical field is 3.5 times higher than that required for equilibrium. In order to correct this, the winding constant, P, can be increased to reduce the $J\theta$ component in the circular section of a layer without affecting the current distribution in the flat section of the layer 85. This reduces the vertical field without any change in $B\theta_{max}$ and with only a small increase in the maximum force density. Therefore, with $P = 1.75$ the maximum force density is 1,730 pounds/cubic inch, the maximum $B\theta$ is 160,000 gauss, and the resulting vertical field is 9,000 gauss, which is the proper value of the vertical field for equilibrium.

This example illustrates that, using the techniques described, the force density can be halved in the tokamak winding 37 of the above-described DT reactor and/or the catalyzed DD reactor of the above-mentioned co-pending application by the co-inventor herein, wherein also the superconductor 15 described in U.S. Pat. No. 3,177,408 by the co-inventor herein is also used to produce a maximum $B\theta$ of 160,000 gauss. Furthermore, the force-reduced winding scheme can produce a vertical field component that is of the proper strength to hold the plasma discharge of the described tokamak plasma current 87 in plasma column 51 in equilibrium.

It will be understood from the above, that in operation this invention also contemplates combining both the two described approaches of a moment-free and a force-reduced coil 25 to generate the needed vertical field by the use of a helical conductor 13 supported on cylinder 47, thereby reducing the forces on them and shaping the return conductors to lie everywhere perpendicular to the resulting two-component (poloidal and toroidal) magnetic field of the described tokamak of the above-mentioned co-pending application, thereby rendering them moment-free. In this regard, for ease of explanation it will be understood that the coil 25 produces the described axial (toroidal) magnetic field, while longitudinally extending conductors 91 produce the described vertical (poloidal) field shaping magnetic fields for centering the plasma column 51 in container 57, which also has a plasma current 89 therein that produces its own pinch type poloidal field around the plasma column 51. In this regard, the combination of the toroidal field produced by coil 25 and the poloidal field around the plasma column 51, which is produced by the plasma current 89 induced in plasma 87 by conductors 91, results in helical 71 lines forming magnetic surfaces 93 around plasma column 51.

It will be understood that the described moment-free and force-reduced techniques contemplated by this invention can be used alone or together in generating fields of large volumes approaching the 250 kilogauss level. Here the fundamental limitations seem to be the strength of the substrate 95 (about 200,000 psi) in conductor 13 and adequate current carrying capacity of the superconductor 15 at that field (about 2,500 amperes/cm³). To this end, any of a variety of materials, such as stainless steel, can be used with the described copper 19 of matrix 17 for strengthening purposes. In this regard, stainless steel ribbons 97 can be used in substrate 95 in addition to the Cu 19 or Al that forms the matrix 17.

Furthermore, it will be understood that in operation, the inside of the solenoid of magnet 49, which is provided by the described coil 25 of this invention, forms an aperture 101 containing plasma column 51, vacuum container 57, a radiation barrier 103 with or without a blanket 105, and a neutron shield 107 with or without a gamma shield 109, such as described in MATT-865 (IEEE Spectrum Vol. 8, No. 11) by the co-inventor of this application, while the outside of magnet 99 is contained in a dewar 71 having a suitable cyrogenic cooling fluid source 111 for circulating a fluid such as liquid nitrogen therethrough, and suitable high reflective or vacuum thermal insulation 43 for minimizing the heat leakage into the dewar 51.

This invention has the advantage of providing a high field strength magnet around a large cross-section aperture formed by the magnet for confining therein a plasma column at a distance from the magnet. To this end, this invention provides a moment-free toroidal solenoid for producing a strong axial toroidal field in the vacuum container. Also, force-reduction enhances this magnet further, while a stablized superconductor therein provides large currents therein safely and economically.

What is claimed is:

1. A magnet for confining a large cross-section plasma column in a strong magnetic field, comprising a cylinder having keyways on the outside thereof, and a stablized superconductor coil having ribbon-shaped toroidal windings keyed on the inside of said toroidal windings into said keyways for tethering the windings to be in tension for reducing the bending moments in said coil when said coil is energized with a large current flow therein.

2. The invention of claim 1 in which coil approximates the cross-sectional shape of a truncated circular coil.

3. The invention of claim 1 in which said coil forms an aperture on the inside thereof having an evacuated container and a plasma current carrying plasma column therein, and said coil is contained in a dewar on the outside thereof for maintaining said superconductor coil in its superconducting state.

4. The invention of claim 1 in which said windings are contained in a case that is keyed into said keyways on the outside of said cylinder.

5. The invention of claim 1 in which said windings are under uniform tension.

6. The invention of claim 1 in which said windings are force-reduced.

* * * * *